May 14, 1940.　　　W. J. MILLER　　　2,200,860
METHOD AND APPARATUS FOR MANUFACTURING POTTERY WARE
Original Filed Feb. 9, 1935　　2 Sheets-Sheet 1
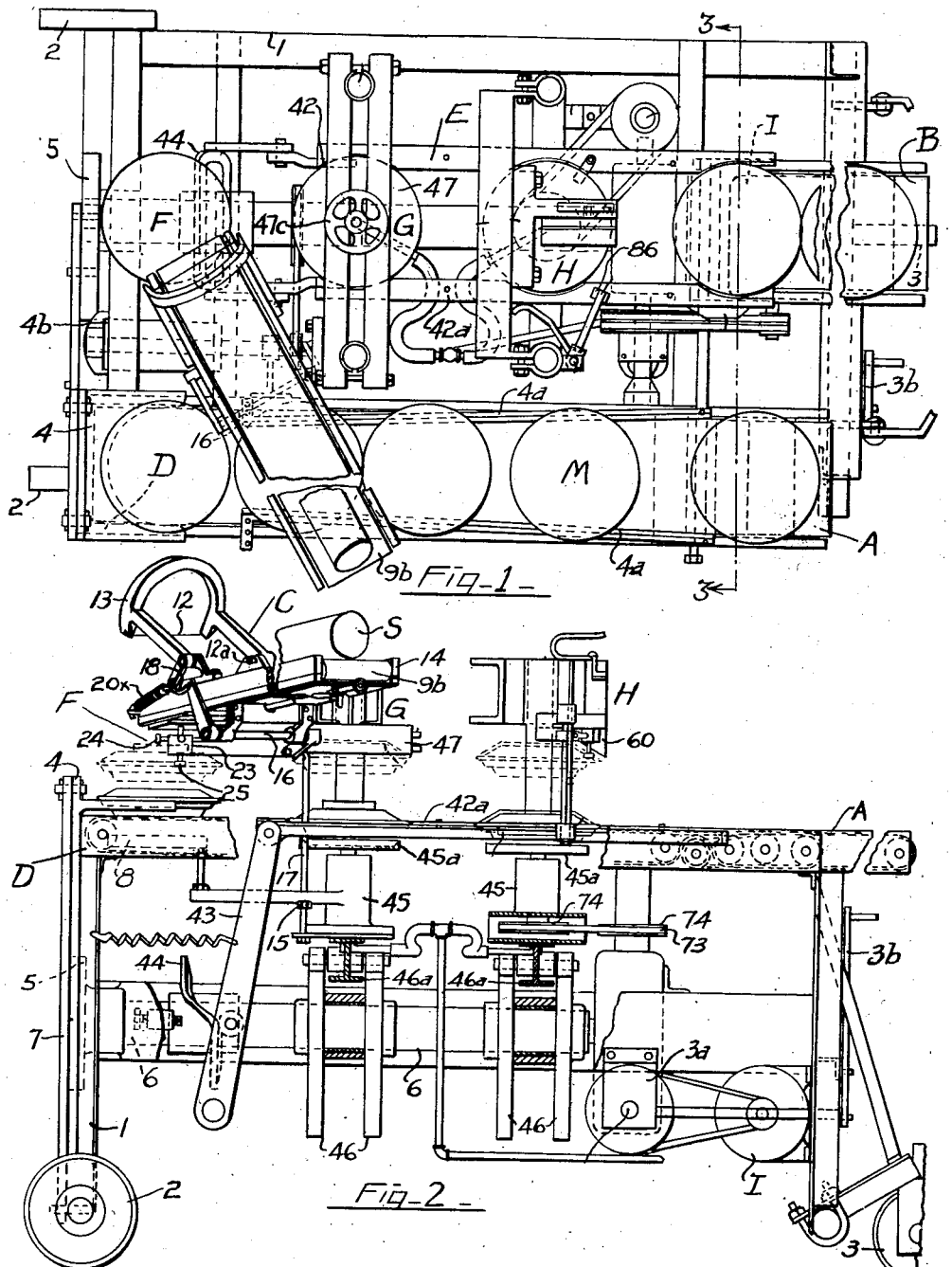
Inventor
William J. Miller
George J. Croninger
Attorney

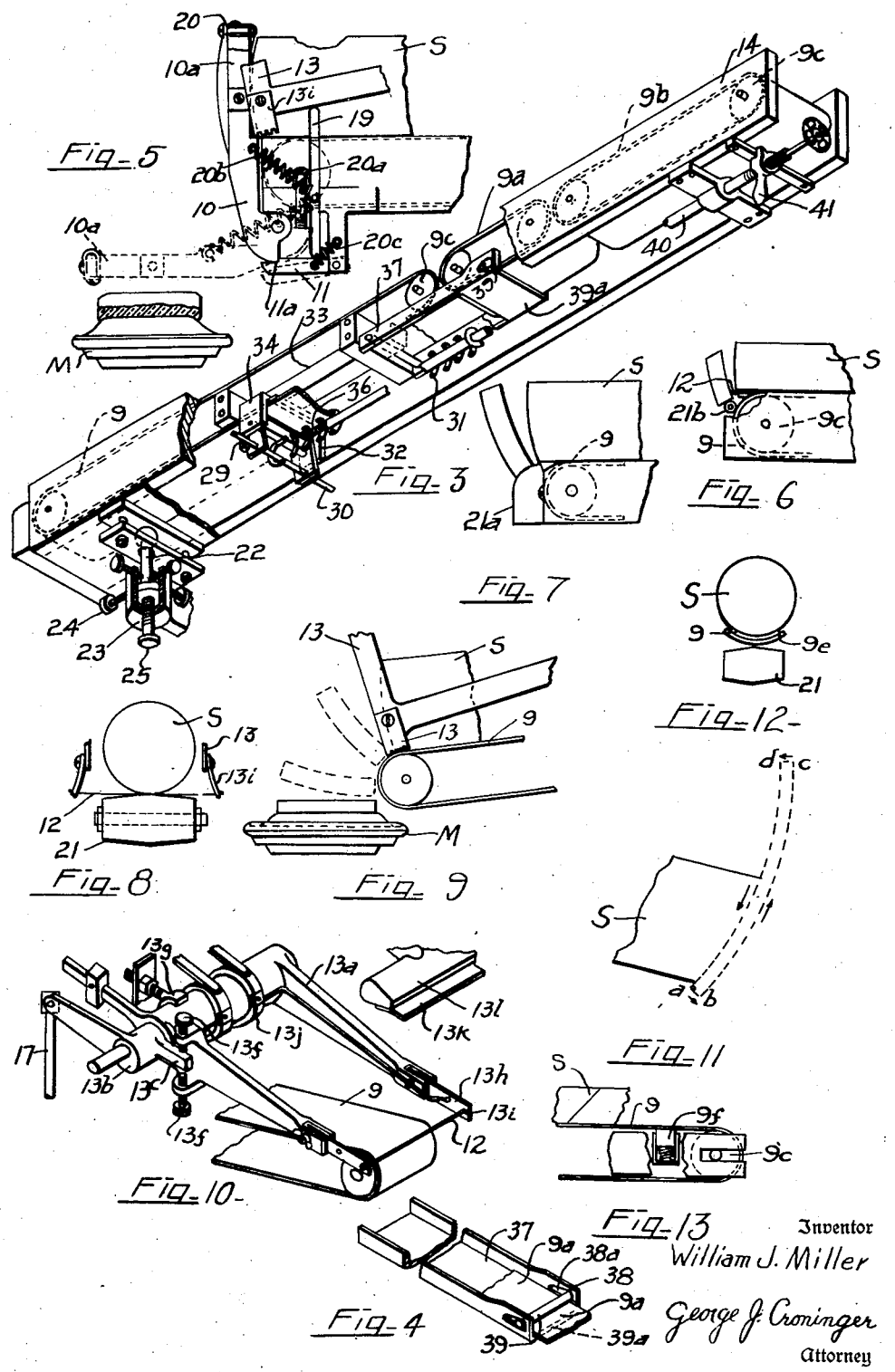

Patented May 14, 1940

2,200,860

UNITED STATES PATENT OFFICE 2,200,860

METHOD AND APPARATUS FOR MANUFACTURING POTTERY WARE

William J. Miller, Swissvale, Pa.

Original application February 9, 1935, Serial No. 5,795. Divided and this application July 20, 1935, Serial No. 32,391

25 Claims. (Cl. 25—22)

This invention relates to methods and apparatus for the manufacture of pottery ware such as cups, saucers, plates and the like known in the art as "dinnerware", from plastic adhesive clay as used in manual jiggering on a potter's wheel. It has to do with new and improved methods of ware production and improved high speed automatic ware fabricating apparatus which may be disposed in operative adjacency to a source of mold supply or storage such as a stoove room, dryer, etc.

This application is a division of my co-pending application for United States Letters Patent, Serial Number 5,795, filed February 9, 1935 and relates particularly to methods and apparatus for production and transfer of clay charges in the automatic manufacture of dinnerware.

The objects as may also be noted in my British Patent 471,589 are to provide new and improved automatic ware fabricating methods and means which will displace the "batter out" in the normal jigger crew; to automatically form and apply charges to molds; to automatically convey the molds to the charging means and present the same for the application of charges thereto in timed relation with the production of charges, to manufacture superior quality ware free from dirt, specks and drying cracks in the display surfaces thereof; to improve methods and apparatus for the forming and feeding of charges to the mold. Briefly, the apparatus consists of a combined clay feeder and segregating means operating in timed relation with each other and with a means for presenting molds for charging, the charges being segregated and gravitated directly into or on a mold, provisions being had for reducing the tendency of the cutting wire to "seal the cut" as well as provisions for wiping and drying the wire and insuring the clean positive release thereof from the clay.

In the drawings:

Fig. 1 is a top plan view of the preferred form of fabricating machine.

Fig. 2 is a side elevation partly in section therewith certain of the parts broken away.

Fig. 3 is a detail in perspective of a clay feeder belt and drive therefor.

Fig. 4 is a detail in perspective of one of the feeder belt clutch devices.

Fig. 5 is an elevation of the charge segregating means and associated charge transfer.

Figs. 6, 7, 8 and 9 disclose various methods and means of segregating and assisting and/or directing the automatic placement of charges on the molds.

Fig. 10 is a detail in perspective of a modified form of charge segregating apparatus and Fig. 11, a motion diagram of the cutting wire stroke.

Fig. 12 is an end view of the feeder belt and concave supporting guide.

Fig. 13 is a fragmentary detail of the feeder felt lubricating means.

According to the general system of my application supra, ware is fabricated progressively in or on absorbent molds, the operations of forming and feeding charges, spreading the charge over the mold surface; adhesively bonding the clay to the mold, jiggering and trimming, all performed mechanically on automatic machinery. The molds are preferably transported manually from a dryer and placed on a conveyor from which each is subsequently removed and automatically fed first to the charge applying means and thereafter to a succession of fabricating stations for procedural steps leading to the completion of the article undergoing production after which it is removed to a dryer.

The preferred apparatus, Fig. 1 comprises generally, a frame I having a three-point support on wheels 2, to avoid torsional stresses, one of which at 3 is swivelled to facilitate directional travel and placement adjacent a dryer. The frame supports drive motor I, a pair of elongated mold conveyors A and B respectively; a charge forming and feeding means C; a mold transfer D for automatically feeding empty molds from conveyor A to position F for charging; another transfer E progresses charged molds to and through the die forming station G; profiling and trimming station H and onto conveyor B, both of said transfers operating in timed relation with each other and with conveyors A and B; the apparatus also including crossheads 46a and mounting chucks 8 and 45a for elevating the molds to operating position. The machine operates in repeated cycles and upon completion of each cycle a finished piece of ware in or on its mold is transferred to conveyor B, the molds accumulating thereon against the time when the operator will remove the same to the dryer.

Normally, the operator places a billet of clay S on feeder belt 9 and manually advances it to correct cutting position and then loads the belt to capacity with reserve billets, welding the ends together as in Fig. 13. He then loads empty molds on conveyor A to capacity and clutches in the drive through lever 3b and clutch 3a, whereupon empty molds are automatically transferred in consecutive order to and through stations F, G and H, the operator continuing to place empty molds on conveyor A until filled molds appear on conveyor B, in sufficient numbers to require, in the operator's judgment, removal.

When conveyor A moves left a predetermined distance, the brim of the lead mold M is centered automatically on frame 4 of transfer D. The frame 4 is shifted to left, Fig. 1, by cam 5 on drive shaft 6 driven by motor I through parallel levers 7 to automatically transfer a mold from conveyor A to centered position over ring chuck 8. The chuck is then elevated through double cam 46, crosshead 46a, and engages the mold through the open bottom of frame 4, elevating it to charging position adjacent the lead end of feeder belt 9 (see dotted lines, Fig. 2) whilst frame 4 is returned to its initial position.

Meanwhile, the convex lead end of cylindrical clay billet S has been progressed by intermittently operated belt 9 into a charge seat 10a, Fig. 5 in pivoted transfer member 10, locked in substantially vertical position by a spring retained dog 11, the extent of billet advance determining the thickness and bulk of the charge. Springs 20 lightly engaging the billet periphery insure charge retention during transfer.

The preferred billet form is that of a relatively large diameter elongate cylinder having mitered ends, Fig. 13, which represents a maximum volume for a minimum peripheral surface area. By severing slices from the lead end of the slug, a disc like charge is produced, having a maximum area of clean clay and a minimum exposed area (in the periphery) of contamination. This contamination is principally in the form of microscopic iron particles that are detached from the surfaces of the knives, screw and pug nozzle by the highly abrasive action of the clay and are normally deposited in the billet skin. If this skin is laid against the mold face or if the clay is masticated during charge formation, the particles are scattered throughout the ware and upon firing become visible as "off color" specks in the display surfaces. My improved method confines contamination to the ware brim zone, generally removed by the trimmer or at least covered by decorations.

A clay slice of measured thickness is then severed on the bias in overbalanced position by adjustable cutting wire 12 which may be heated, dried or wiped of adhering clay as hereinafter described, to reduce its cut sealing characteristics and insure free drop of the slice. The wire is preferably oscillated in a predetermined substantially rectilinear path (see diagram, Fig. 11) by frame 13 having a shifting pivot in elongated bearings 12a attached to feeder frame 14, and connected to an actuating crank 16, Fig. 2, by elastic members 18. This crank is operated in unison with crosshead 46a, the position and extent of reciprocation being determined by the adjustment of nuts 15 on connecting rod 17.

When pin 19, Fig. 5, is depressed at the end of cutter frame stroke, pawl 11 is disengaged from abutment 11a, releasing the overbalanced transfer ring 10 which pivots against adjustable stop 20a (see dotted position) centering the charge in a predetermined substantially horizontal position over the mold. The slice is released from springs 20 by its momentum for a short drop to the central zone of the mold surface and there flattens radially due to its convexed engaging face, to avoid air entrapment. Balance spring 20b returns empty transfer to latched position, subsequent to the forward shift of frame 13 by spring 20x moving the cutting wire from a to b (see Fig. 11) and away from the billet end to avoid contact with the end of the billet and consequent clay accumulation on the wire upon rise from b to c and horizontal travel from c to d, to initial position. As frame 13 rises, spring 20c returns dog 11 to latched position and elevates trip pin 19.

In the modification of Fig. 10, the cutter frame 13a is pivoted on an eccentric sleeve 13b oscillated by rod 17 to alternately move abutment 13c into frame elevating or lowering engagement with adjustable screws 13f causing the cutting wire to traverse the arcuate path from d to a and b to c, Fig. 11. At the termination of the downstroke or upstroke, the frame is held against rotation by friction drag 13g whilst the abutment 13c travels between screws 13f, and the frame is moved radially shifting the wire from a to b or c to d according to the position of the frame. The sides of the motion parallelogram of Fig. 11 may be varied by screws 13f to increase or decrease the horizontal and vertical travel of the wire. The wire may be additionally adjusted relative to the platen by movable mounting members 13h, Fig. 10, notched at 13i. In Fig. 5, the mounting members 13i tension the wire which is of predetermined length and solder tipped for quick mounting and interchange in notches. In Fig. 10, the wire may be continuously or intermittently electrically heated according to the type of ring contact 13j employed, to dry the same after adhering clay is removed by stationary canvas wiper 13k. Hot air may also be directed against the wire by nozzle 13l.

It is quite important that the wire be devoid of adhering clay lest this sticky accumulation close the cut during severing, usually by creating a vacuum behind the wire which tends to reseal the cut and prevent free fall of the slice, the aforesaid methods relieving the operator of constant observation.

By severing charges on the center of a crowned roller 21 as in Fig. 8 and in overbalanced position directly against the belt, the slice may be guided directly onto the mold according to the dotted line disclosure of Fig. 9 with the farther rim portion of the slice face first engaging the mold. In Figure 7, the arcuate surface of stationary platen 21a, which may be lubricated, guides the fall of the slice. The slice may also be severed on a rotatable platen 21b, Fig. 6, to insure reliable gravitation.

The feeder frame is vertically and adjustably supported at the rear end thereof, the forward end being also adjustably supported by stud 22, Fig. 3 seated on screw 25, and positioned horizontally by radial screws 24, in cup 23, attached to the machine frame.

The adjustable inclined position of the frame insures predetermined gravitation of reserve billets on idler belt 9b for collision with and welding on the bias to the tail of preceding billets on driven belts 9 and 9a and reduces power required to advance billets and increase the gravity pull on the slice to insure its parting from the slug during cutting and reduces its angle change of position during drop to mold. These belts are mounted on spaced, adjustable idle rollers 9c, having slightly concave surfaces to avoid slug distortion and are supported between rollers by slightly concave metal troughs 9. Belt lubrication is by spring pressed graphite blocks 9f mounted in feeder frame, Fig. 13.

When rod 30, Fig. 3, resting against stops 29, is released by initial movement to right of crank 16, a spring 31, connected to tube 40, shifts rod 30 to right, tilting U-shaped lever 32, pivoted in bracket 34 and pinches the belt 9 therebetween, whereupon, the clutch assembly secured to and guided by square rod 33 is advanced by spring 31 to right and drags belt 9 until rod 30 engages adjustable rods top 36. This adjustment determines the length of billet advance and the thickness of the slice next to be severed. The tension in spring 31 is adjusted through threaded engagement of tube 40 with latch 41. To avoid parting of the billets at the weld, belt 9a is driven in unison with 9 by auxiliary roller clutch having frame 37, Fig. 4, connected to rod 33 and having elongated taper slots 38a in each terminal 38 with loose fitting necked roller 39 for binding the belt against web 39a when shifted to right. This also permits the free forward travel of belt 9a either manually or by gravity to abut succeeding billets. Feeding may be discontinued by releasing the latch 41, Fig. 3, and the billet advanced manually to correct position by reciprocating the tube 40. Both clutches are idly retracted upon engagement of rod 30 by crank 16 thus "tensioning" spring 31 for succeeding advance of belt.

After the mold is charged at F and lowered onto the end seat 42 of transfer E, the transfer is shifted to right, Figs. 1 and 2, by levers 43, and cam 44 on the shaft 6 to advance the mold to the blank forming station G. The transfer may be quickly adjusted to accommodate molds of other size by removing the dowelled bars 42a and substituting bars having mold seat portions of correct size. Chuck 45a on stand 45 is then elevated by peak cams 46 and crosshead 46a, lifting the mold into co-operation with a stationary die 47, which engages, progressively spreads and adhesively bonds the clay to the mold. The charge preferably is in the form of a disc and lies in centered or approximately centered position on the mold covering only a portion of the ware forming surface; upon engagement with the die, the material is spread radially and evenly until the ware surface is completely covered, the contaminated slice brim flowing to the mold brim and subsequently being trimmed or cracking off during drying.

After the clay is applied to the mold and adhesively bonded thereto, the mold is advanced by transfer 42 to the profile station H, where it is rotated through belt and pulley 73 and 74 in engagement with the tool 60 whilst fluid is applied, thereby removing excess material from and smoothing and finishing the surface of the clay, whilst the mold is rotated, a trimming tool 86 trims the brim and upon termination of the profiling operation the mold is returned to conveyor E which shifts to the right and loads the mold onto conveyor B, operating in timed relation with conveyor A. The molds are subsequently transferred to a dryer, all substantially as described more in detail in my co-pending application supra.

What I claim is:

1. In apparatus for the manufacture of dinnerware on absorbent molds the combination which comprises, means for supporting clay billets containing a multiple of mold charges, means for progressing said billets toward a point of charge segregation, means for segregating clay charges from said body, means for operating said billet progressing means and said segregating means in timed relation, a mold support, means for delivering molds to said support and removing molds therefrom, means for operating said last named means in timed relation with said segregating means and said billet progressing means whereby molds are moved in succession into adjacency to said point of charge segregation and charges formed in succession and dropped onto said molds said charges being of substantially disc-like proportions of smaller diameter than the diameter of the ware forming surface of the aforesaid molds.

2. In apparatus for the manufacture of dinnerware upon absorbent molds, a mold support and mold, means for feeding billets of clay from which mold charges are segregated superimposed relative thereto, means for locating the discharge end of the feeding means relative to the support, means for segregating charges, said charges being of substantially circular proportions and of smaller diameter than the diameter of the ware forming surface of the mold and means for varying the size of the charge segregated from the billet.

3. In apparatus for the manufacture of dinnerware on absorbent molds, a mold support and mold, means for feeding billets of clay from which mold charges are segregated superimposed relative thereto, means for locating the feeding means relative to the support and mold, means for segregating clay bodies of substantially disc-like proportions and of smaller diameter than the diameter of the molding surface of the mold and including means for predetermining the path of travel of the segregating means.

4. In apparatus for the manufacture of dinnerware on absorbent molds, a mold support and a mold, means for feeding billets of clay from which mold charges are segregated superimposed relative thereto, means for adjusting the discharge end of the feeding means toward and away from the mold support and mold, means for adjusting the feeding means heightwise as respects the mold support and mold, segregating means and means for varying the size of the charge.

5. In apparatus for the manufacture of dinnerware on absorbent molds, the combination which comprises a movable mold support, means for depositing molds on and removing molds from said support, a clay feeder superimposed relative to said support, means for adjusting the discharge end of the feeder relative to the axis of the mold support and means for slicing disc-like bodies of clay of smaller diameter than the diameter of the molding surface of the molds, thereby characterized that the clay segregating means segregates charges in elevated position relative to the mold support and the clay thus segregated is permitted to freely drop onto the surface of a mold resting on said mold support.

6. In a clay feeder, a frame, a belt on which clay billets are deposited, a cutter, means for actuating said cutter to segregate slices of clay from said billet, a charge transfer arranged to receive the segregated slice of clay and carry said slice to centered position over a mold, means arranged to be engaged by the transfer to limit the downward movement thereof and a locking means arranged to normally hold the transfer in raised position adjacent the end of the billet.

7. In a clay feeder, a frame, a belt on which clay billets are deposited, means for actuating said belt, a cutter, means for actuating said cutter to segregate slices of clay from said billet, a charge transfer arranged to receive slices of clay and carry the same to centered position over a mold, a bumper arranged to be engaged by the transfer to limit the downward movement thereof, a counterbalance for returning the transfer to raised position adjacent the end of the billet.

8. In a clay feeder, a frame, a belt on which clay billets are deposited, means for actuating said belt, a charge segregating means, means for actuating said segregating means to sever slices of clay from said billet, a charge transfer device mounted in front of said belt arranged to transfer clay slices to empty molds, a lock for holding said transfer in elevated position, means actuated by said charge segregating device for releasing said lock and a spring for returning said transfer to raised position.

9. In a clay feeder, a feeder belt having an upper run inclined to the horizontal arranged to receive elongated billets of clay from which slices are severed, a cutter located adjacent the lower end of said belt and arranged to segregate slices of clay from the end of said billet in overbalanced position and a support arranged adjacent the lead end of said belt to direct the fall of the aforesaid slices.

10. In a clay feeder, means for supporting and advancing billets of clay from which slices are segregated, a cutter mounted adjacent the feeding and supporting means and arranged to segregate clay slices from the said billets in overbalanced position, a surface on which said slices rest when each is segregated said surface being contoured or positioned to direct the fall of the slice outwardly and away from the billet.

11. In combination with a mold support and a mold, a clay feeder arranged in elevated position relative thereto having a belt for receiving clay billets from which slices each representing a mold charge are segregated, a cutter located adjacent one end of said belt and arranged to segregate substantially symmetrical slices of clay in overbalanced position each slice dropping to the surface of a mold by gravity, a support located ahead of the belt on which the slice rests incident to segregation and about which it pivots as it commences to fall toward the mold and means for adjusting the feeder heightwise relative to the mold to vary the length of drop of the slice.

12. In combination with a mold support and a mold, a clay feeder arranged in elevated position relative thereto having a belt for receiving clay billets, means for actuating said belt, a cutter arranged adjacent the lead end of the belt for segregating slices of clay in overbalanced position which drop to the molding surface of the mold by gravity, means for moving the cutter end of the feeder vertically relative to the mold support thereby characterized that the distance between the end of the feeder belt and the mold support can be increased or decreased to obtain the proper height from which a slice of given weight and diameter should fall so as to drop against the mold and flatten thereon without folding over or striking on its rim.

13. In combination with a mold support, a clay feeder arranged in elevated position relative thereto on which clay billets are supported in inclined position, a cutter located adjacent the lead end of said billet for slicing said billet, a surface on which said slices are segregated and from which said slices fall incident to segregation, means for shifting the cutter forward in the direction of travel of the billet and away from the lead end of the billet at the termination of the cutting stroke and means for actuating said feeder to feed the billet lengthwise to said cutter and means for retracting the cutter.

14. In a clay feeder, a belt for receiving and supporting clay billets from which clay slices are segregated, a cutter arranged adjacent one end of said belt and adapted to segregate clay slices in overbalanced position which fall from the end of the feeder, means for shifting the cutter forward at the termination of the cutting stroke and away from the end of the billet and means for actuating said feeder belt thereby characterized that when the slice of clay is segregated it falls from the feeder clearing the zone into which the cutter is shifted said cutter being shifted to avoid interference with the billet when said cutter is raised preparatory to making the next cutting stroke.

15. In combination with a mold, means for charging said mold with clay which comprises a belt on which is located a billet of clay from which slices are severed in overbalanced position for a free drop to the surface of the mold, a cutter arranged to segregate the slices, a support on which the slices are severed and about which the slices pivot in falling toward the mold and means for treating the cutter to preclude sealing of the cut as the slice is segregated.

16. In apparatus for charging molds in the manufacture of potteryware, the combination which comprises a moveable support adapted to receive billets of clay, means for progressing said billets toward a point of charge segregation, means for segregating charges from said billets, said charges being gravitated directly upon segregation onto said molds and means for predetermining the gravitational path of said charges.

17. In apparatus for charging molds with clay in the manufacture of potteryware, means for feeding billets of normally adhesive and moist clay to a point of charge segregation, a charge segregating means associated with said feeder and having a cutting member arranged to pass through and sever bodies of clay from said billets and means for removing the accumulated clay residue which collects on the cutter to thereby prevent resealing of the cut.

18. In an apparatus for preparing clay charges for applications to molds in the manufacture of pottery, the combination which comprises means on which billets of clay are deposited and progressed toward a point of charge segregation, means for segregating clay charges from said billets, means in which the charge is severed for carrying the charges thus severed to the mold and means for causing the carrying means to release the charge of clay.

19. In a clay feeder, means for receiving and supporting clay billets from which clay slices are segregated, a cutter arranged adjacent one end of said means and means for causing said cutter to shift forward and away from said billet at the termination of a segregating stroke and to be elevated relative to said billet prior to the next succeeding advance of said billet.

20. A method of feeding clay to molds which comprises, segregating a disc-like slice of clay of smaller diameter than the molding surface of the mold from a billet arranged in superimposed position relative to a pre-positioned mold, gravitating the charge of clay onto the molding surface of the mold and locating the charge in substantially centered position on the mold by predetermining and controlling the path of gravitation of the charge.

21. In apparatus for charging molds with plastic material in the manufacture of potteryware, the combination which comprises, a mold carrier having molds disposed thereon and arranged by the movement of the carrier to be brought into a charging position, means arranged to receive plastic material and progress the same toward a point of charge segregation, said means including a belt adapted to receive and support the plastic material upon an upper run thereof and a belt grapple engaging the belt in another zone for advancing the said belt together with means for actuating said grapple.

22. In apparatus for charging molds in the manufacture of potteryware, the combination which comprises means for receiving and progressing billets of clay toward a point of charge segregation, means for segregating charges from said billets, said charges being gravitated directly upon segregation onto said molds, said means for receiving and progressing billets of clay comprising a belt, a reciprocal grapple for moving said belt and means for varying the extent of reciprocation of said belt grapple to thereby vary the progress of the billet toward a point of charge segregation.

23. In apparatus for charging molds with plastic material in the manufacture of pottery, the combination which comprises, a mold carrier having molds disposed thereon and arranged by the movement of the carrier to be brought into a charging position, means for receiving billets of plastic material, means for progressing the same toward a point of charge segregation, means for segregating said plastic material comprising a cutting instrumentality and means for preventing resealing of the cut.

24. In the manufacture of dinnerware on absorbent molds, the method of feeding which comprises, segregating substantially disc-like clay charges of smaller diameter than the molding surface of a mold from a cylindrical billet of clay superimposed with relation to a mold adapted to receive the aforesaid charge and concurrently with the segregation of the charge causing it to fall freely by gravity into centered position on the mold.

25. In the manufacture of dinnerware on absorbent molds, the method which comprises, advancing a column of clay toward a point of charge segregation, passing a segregating means through the clay in a direction perpendicular to the long axis thereof, permitting the clay thus segregated to gravitate onto the ware forming surface of a mold, moving the segregating means in a direction substantially parallel with the direction of advance of the column of clay and then returning the segregating means to initial position for a succeeding segregating stroke.

WILLIAM J. MILLER.